US010380622B2

(12) United States Patent
Phillips et al.

(10) Patent No.: US 10,380,622 B2
(45) Date of Patent: Aug. 13, 2019

(54) MANAGING DISPLAY OF ADVERTISEMENTS ON A WEB PAGE WITH RESPECT TO A PORTION OF WEB PAGE CONTENT

(75) Inventors: Christopher Phillips, Southampton (GB); Matthew D. Whitbourne, Hants (GB)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 13/479,446

(22) Filed: May 24, 2012

(65) Prior Publication Data
US 2012/0310754 A1    Dec. 6, 2012

(30) Foreign Application Priority Data

Jun. 1, 2011   (EP) ..................................... 11168427

(51) Int. Cl.
*G06Q 30/02*    (2012.01)
(52) U.S. Cl.
CPC ......... *G06Q 30/0241* (2013.01); *G06Q 30/02* (2013.01); *G06Q 30/0277* (2013.01)
(58) Field of Classification Search
CPC . G06Q 30/02; G06Q 30/0209; G06Q 30/0277
USPC ..................................................... 705/14.73
See application file for complete search history.

(56) References Cited

U.S. PATENT DOCUMENTS

| 7,877,290 | B1* | 1/2011 | Arsenault et al. ........... 705/14.4 |
| 2006/0111970 | A1 | 5/2006 | Hill et al. |
| 2007/0271140 | A1* | 11/2007 | Kanno ............................ 705/14 |
| 2008/0163071 | A1* | 7/2008 | Abbott et al. ................ 715/748 |
| 2008/0263673 | A1* | 10/2008 | Brun et al. ...................... 726/26 |
| 2009/0012863 | A1* | 1/2009 | Saephan ......................... 705/14 |
| 2010/0023375 | A1 | 1/2010 | Tomlin et al. |
| 2010/0198694 | A1 | 8/2010 | Muthukrishnan |
| 2010/0211467 | A1 | 8/2010 | Ramanathan |
| 2011/0078726 | A1* | 3/2011 | Rosenberg et al. ............. 725/34 |
| 2013/0066725 | A1* | 3/2013 | Umeda ....................... 705/14.66 |
| 2013/0066726 | A1* | 3/2013 | Umeda ....................... 705/14.71 |

FOREIGN PATENT DOCUMENTS

WO    WO2009/038258    3/2009

* cited by examiner

*Primary Examiner* — Johnna R Loftis
(74) *Attorney, Agent, or Firm* — Michael A. Petrocelli

(57) ABSTRACT

Processes, devices, and articles of manufacture are disclosed for managing the display of advertisements on a web page. Each may be configured for steps that include determining the length of a portion of web page content, assigning a priority to each of a set of advertisements for display on a web page, selecting advertisements for display on a web page, determining the difference between said length of said portion of web page content and the cumulative length of said selected advertisements, and if the length of the advertisement exceeds said difference then omitting the advertisement and selecting another.

18 Claims, 3 Drawing Sheets

| Advertisement ID | Length | Current Priority (Base) |
|---|---|---|
| A | 200 | 1(1) |
| B | 1500 | 2(2) |
| C | 400 | 2(2) |
| D | 300 | 3(3) |
| E | 1000 | 4(4) |

Figure 2a

| Advertisement ID | Length | Priority(Base) |
|---|---|---|
| A | 200 | 1(1) |
| B | 1500 | 2(2) |
| C | 400 | 1(2) |
| D | 300 | 3(3) |
| E | 1000 | 4(4) |

Figure 2b

MANAGING DISPLAY OF ADVERTISEMENTS ON A WEB PAGE WITH RESPECT TO A PORTION OF WEB PAGE CONTENT

BACKGROUND

The present disclosure relates to methods, devices and computer program products for managing the display of advertisements on a web page with respect to a portion of web page content.

Web pages may include one or more paid-for advertisements that are displayed alongside the web page content. Such advertisements may provide an important revenue stream for the web site provider. When a given web page is rendered, the advertisements are rendered alongside the web page content. Since the space on a given web page is limited, not all advertisements may be satisfactorily displayed. For example, some advertisements may not be fully displayed or may be omitted. Some advertisements may not be displayed adjacent the web page content. If advertisements are not displayed correctly, then advertisers are not receiving full value for their advertisements. This may discourage advertisers, thus reducing an important revenue stream for the web site provider.

BRIEF SUMMARY

Methods, devices, and computer program products are provided wherein advertisements for a web page may be evaluated, characterized, managed or displayed. These and other methods, products that store instructions for carrying them out, and devices configured as such, may work together, alone, and in various combinations for managing the display of advertisements on a web page.

Embodiments may include managing the display of an advertisement on a web page with respect to portions of web page content. Embodiments of these and other configurations may include some or more of the following: determining the length of a portion of web page content; assigning a priority to each of a set of advertisements for display on a web page in association with the web page content, each advertisement having a predetermined length; selecting the advertisements for display on a given web page in association with the portion of web page content, the advertisements being selected in sequence based on their assigned priority; whereby in response to the selection of each advertisement, determining the difference between the length of the portion of web page content and the cumulative length of the selected advertisements; and if the length of the next advertisement in sequence for selection exceeds the difference then omitting the next advertisement and selecting the subsequent advertisement in sequence.

Embodiments may also comprise some or more of the following, which may be carried out in processes, instructions for configuring a processor, and in other configurations as well. Increasing the priority for each omitted advertisement; decreasing the priority for each advertisement selected for display; assigning a base priority to one or more of the advertisements; and resetting the priority of a given advertisement to the base priority in response to the given advertisement being selected for display.

Embodiments may further comprise components, devices, and the like configured, alone or with other components, for managing the display of an advertisement on a web page with respect to a portion of web page content. Embodiments may be configured to: determine the length of a portion of web page content; assign a priority to each of a set of advertisements for display on a web page in association with the web page content, each advertisement having a predetermined length; select the advertisements for display on a given web page in association with the portion of web page content, the advertisements being selected in sequence based on their assigned priority; in response to the selection of each advertisement, determine the difference between the length of the portion of web page content and the cumulative length of the selected advertisements; and if the length of the next advertisement in sequence for selection exceeds the difference, then omit the next advertisement and select the subsequent advertisement in sequence.

Embodiment may provide a computer program stored on a computer readable medium and loadable into the internal memory of a computer, comprising software code portions arranged, when the program is run on a computer, for performing a method for managing the display of an advertisement on a web page with respect to a portion of web page content, the method comprising: determining the length of a portion of web page content; assigning a priority to each of a set of advertisements for display on a web page in association with the web page content, each advertisement having a predetermined length; selecting the advertisements for display on a given web page in association with the portion of web page content, the advertisements being selected in sequence based on their assigned priority; whereby in response to the selection of each advertisement, determining the difference between the length of the portion of web page content and the cumulative length of the selected advertisements; and if the length of the next advertisement in sequence for selection exceeds the difference, then omitting the next advertisement and selecting the subsequent advertisement in sequence.

For each of the above and throughout the disclosure, various features and processes may be further modified, may be combined, and may be performed in different orders and with more or fewer components and features.

BRIEF DESCRIPTION OF THE DRAWINGS

Embodiments will now be described, by way of example only, with reference to the accompanying drawings in which:

FIGS. 2*a* and 2*b* are tables illustrating data as may be used by the web page server application program of FIG. 1.

DETAILED DESCRIPTION

Figure 1:
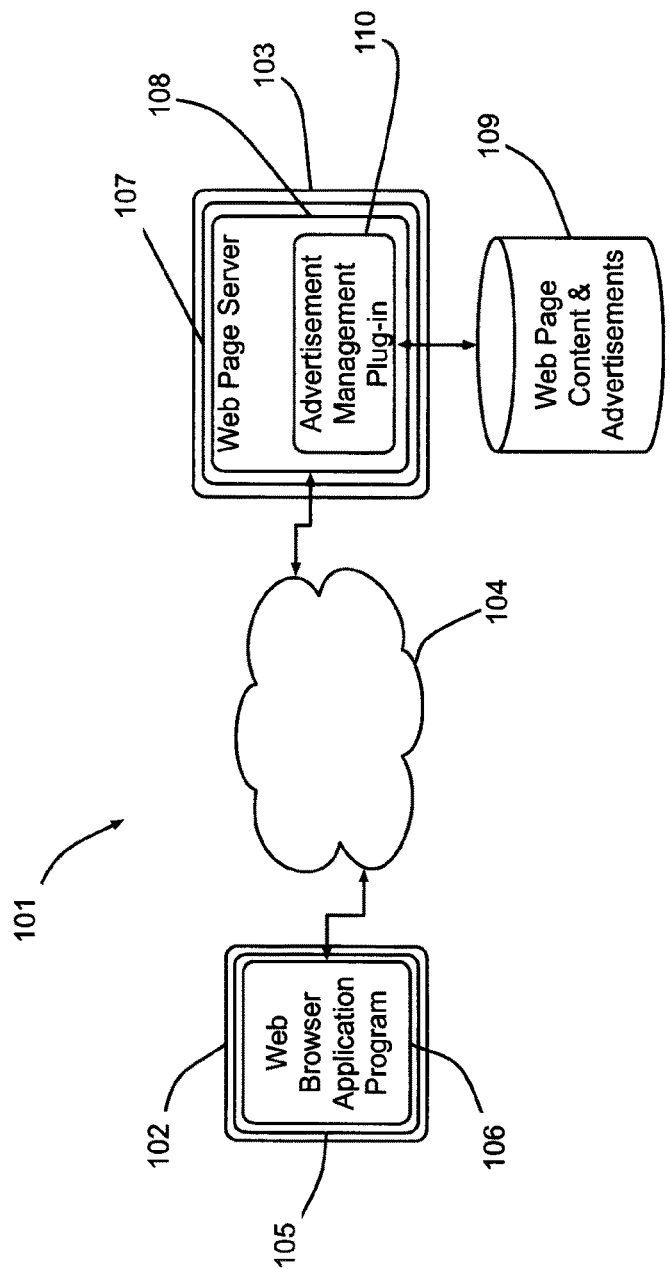
FIG. 1 is a schematic illustration of a computer network including a computer running a web page server application program.

With reference to FIG. 1, a computer system 101 comprises a first computer 102 and a second computer 103 interconnected by a network 104. The first computer 102 is loaded with an operating system 105 arranged to provide a processing platform for a web browser application program 106. The second computer 103 is also loaded with an operating system 107 arranged to provide a processing platform for a web page server application program 108. The web browser application program (web browser) 106 is arranged to enable the user to access or request web pages provided by the web page server application program (web page server) 108.

In the present embodiment, the second computer is connected to a storage device 109 arranged to store portions of web page content and advertisements. In response to a request from the web browser 106 for a given web page, the web page server 108 is arranged to select the appropriate portion of web page content and an associated set of advertisements. The web server 108 then renders the web page from the selected items and provides the rendered page to the web browser 108 via the network 104 for display to the user of the web browser 108. In the present embodiment the web page server 108 is augmented with an advertisement management plug-in program (AMP) 110. The AMP 110 in this and other embodiments may be arranged to manage the selection of advertisements for display with a given portion of web page content in accordance with a predetermined prioritisation protocol.

With reference to FIG. 2a, the AMP 110 is provided with a set of priority data 201 associated with each of the available advertisements. The priority data 201 comprises an entry for each advertisement. Each entry lists a unique advertisement identifier (Advert ID) 202, length data (Length) 203 representing the display length of the advert and priority data (Current Priority (Base)) 204, 205. In the present embodiment, the length data 203 represents the length of a given advertisement in pixels. The priority data 204, 205 comprises a current priority variable 204 and a base priority value 205. On creation of an entry for a given advertisement, the base priority value 205 may be determined and the current priority value 204 may be set to the same value. In embodiment, the lower a priority value 204 the higher the priority.

In response to the rendering of a given web page, the AMP 110 may be arranged to determine the length, in pixels, of the relevant portion of web page content and then to select advertisements to be displayed alongside. The AMP 110 may also be arranged to select advertisements in sequence according to their current priority value 204, with higher priority advertisements being selected first. The AMP 110 may also be arranged to take into account the cumulative length of the selected advertisements relative to the length of the portion of web page content. If the next advertisement to be selected in sequence has a length which exceeds the difference between the length of the portion of web page content and the cumulative length of the currently selected advertisements then the AMP 110 may be arranged to omit that next advertisement and instead select the subsequent advertisement in sequence. The AMP 110 continues selecting advertisements in this manner until the cumulative length of selected advertisements equals the length of the portion of web page content or until all available advertisements have been considered. The AMP 110 may then provide the selected advertisements and associated portion of web page content to the web server 108, which may then render the web page and sends it to the requesting web browser 106.

With reference to the priority data 201 of FIG. 2a, given a portion of web page content of 2000 pixels, then advertisements A, B and D may be selected for rendering. Advertisement C may be omitted since at the point of its selection the difference between the cumulative length of the selected advertisements (A+B=1700 pixels) and the length of the portion of web page content (2000 pixels) is less than the size of advertisement C (400 pixels). Once advertisement D is selected then the cumulative length of the selected advertisements equals the length of the portion of web page content and thus the AMP 110 sends to the selected items for rendering by the web server 108.

The AMP 110 may be arranged to modify the priority of a given advertisement depending on whether the advertisement was selected or omitted for display in relation to a given portion of web page content. If an advertisement is omitted from a given selection then the AMP 110 may be arranged to decrement its current priority value 204, thus increasing the priority of the advertisement and thereby increasing its chances of being selected in a subsequent selection process. Such subsequent selection may be performed in relation to a different portion of web page content. If an advertisement is selected, the AMP 110 may be arranged to reset its current priority variable 204 to its corresponding base priority value 205. Thus, with reference to FIG. 2b, in response to the omission of advertisement C from the selection described above, its current priority value 204 is decremented, thus increasing its priority. If the next web page request relates to web page content greater than or equal to 600 pixels in length, the increased priority value 204 of advertisement C will result in its selection before advertisement B is considered.

Figure 3:
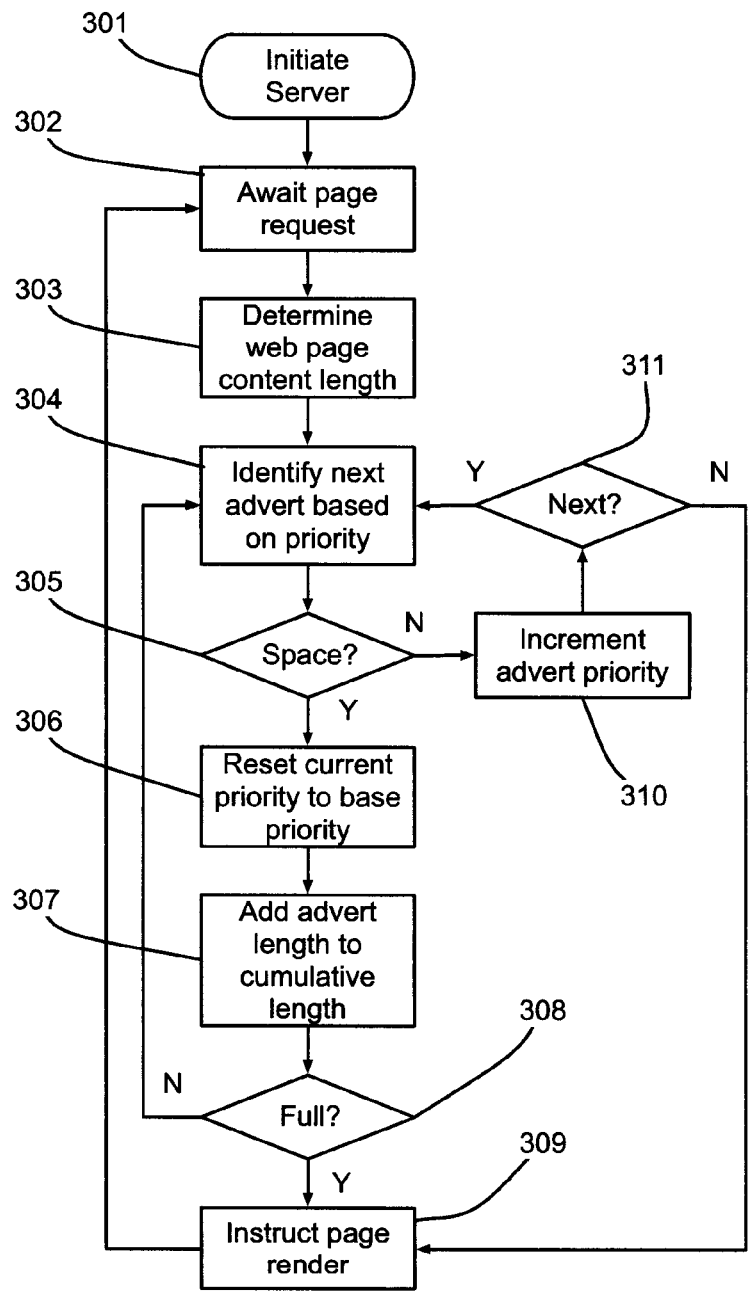
FIG. 3 is a flow chart illustrating processing as may be performed by the web page server application program of FIG. 1.

The processing performed by the AMP 110 when managing the selection of advertisements in accordance with the prioritisation protocol will now be described further with reference to the flow chart of FIG. 3. Processing may be initiated at step 301 in response to the receipt of a request for a given web page by the web server 108 and processing moves to step 302. At step 302 processing awaits a request for a web page and once received moves to step 303. At step 303 the length of the relevant portion of web page content may be determined and processing may move to step 304. At step 304 the first advertisement may be identified for selection based on the priority data 201 and processing moves to step 305. At step 305 the difference between the length of the relevant portion of web page content and the cumulative length of any already selected advertisements may be determined and compared to the length of the identified advertisement to determine whether or not the identified advertisement will fit in the remaining space. If the identified advertisement will fit, processing may move to step 306. At step 306 the current priority value 204 of the newly selected advertisement may be reset to the base priority value 205 and processing may move to step 307. At step 307 the length of the selected advertisement may be added to the cumulative length of all the currently selected advertisements and processing may move to step 308. At step 308 the updated cumulative length may be compared to the length of the portion of web page content and if space remains processing may return to step 304 and proceed as described above to select the next advertisement. If at step 308 the updated cumulative length equals the length of the portion of web page content then processing may move to step 309 where the selected advertisements and web page content may be identified to the web server 108 with an instruction to render the page for sending to the requesting web browser 106. Processing may then return to step 302 and proceeds as described above.

If at step 305 the difference between the length of the relevant portion of web page content and the cumulative length of any already selected advertisements is less than that of the identified advertisement then processing moves to step 310 where the priority value 204 for the omitted advertisement is decremented and processing moves to step 311. At step 311 if more advertisements remain for consideration then processing returns to step 304 and proceeds as described above. If all advertisements have been considered then processing may move to step 309 and proceed as described above.

In embodiments, the higher the priority, the higher the priority value may be. Thus, the priority value of an omitted advertisement may be incremented. In this embodiment, a repeatedly omitted advertisement may reach a higher priority than that normally assigned to the highest priority advertisement.

In embodiments, the length of the portion of web page content may be set dynamically in dependence on the size of the window of the web browser in which it is to be displayed. In response to the resizing of the browser window the web page may be re-rendered by the web server to take into account any change in the length of the portion of web page content. The re-rendered page may comprise a different set of advertisement to the previous version of the web page as determined by the AMP. The rate at which the web page is re-rendered in response to such resizing of the browser window may be limited to avoid resizing rates above a predetermined frequency.

As will be understood by those skilled in the art, any suitable prioritisation protocol may be utilized using any suitable searching technique to select suitable candidate advertisements for selection.

It will also be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While various embodiments have been illustrated, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

What is claimed is:

1. A method for managing the display of an advertisement on a rendered web page with respect to a portion of web page content, said method comprising the steps of:
   at a first computer, the first computer connected to a storage device, the storage device arranged to store portions of web page content and advertisements, receiving a request for a web page from a second computer;
   at the first computer, determining the display size of web page content to be rendered in response to the request for a web page;
   at the first computer, assigning a priority to advertisements in a set of a plurality of advertisements stored on the storage device, one or more of the advertisements in the set for display on a world wide web page in association with said web page content, each of said advertisements in said set having a display size;
   in association with assembling advertisements to be rendered with web page content and to be rendered for display on a given world wide web page, considering, by the first computer, advertisements in the plurality of advertisements in sequence based on their assigned priority, said considering including determining the difference between said display size of said portion of web page content and the cumulative display size of a plurality of considered advertisements for display on a world wide web page, wherein if the display size of a next advertisement in sequence for consideration exceeds said difference then omitting said next advertisement from selection and considering the subsequent advertisement in sequence for selection for display on a world wide web page;
   selecting, by the first computer, one or more of the considered advertisements such that the cumulative display size of the selected advertisements does not exceed the display size of said portion of web page content;
   and rendering the web page requested from the second computer with the selected advertisements and sending the rendered web page from the first computer to the second computer, wherein a length of the web page being rendered is dynamically set by the first computer dependent upon the size of the window of the web page of the web browser of the second computer in which the web page is to be displayed.

2. The method of claim 1 further comprising: limiting a rate at which the rendered web page is re-rendered.

3. The method of claim 2 wherein limiting the rate is performed in order to avoid resizing rates above a predetermined frequency.

4. The method of claim 1 further comprising: assigning a base priority to one or more of said advertisements; and resetting said priority of a given advertisement to said base priority in response to said given advertisement being selected for display, 3 wherein instructions on the server for determining the display size of web page content to be rendered in response to the request for a web page and assigning a priority to advertisements in a set of a plurality of advertisements stored on the storage device are resident in an advertisement management plug-in (AMP).

5. The method of claim 1 wherein at least the display size of web page content determined reflects the pixel size of the web page content or the display size of considered advertisement reflects the pixel size of the considered advertisements.

6. The method of claim 1 further comprising, in response to resizing of a browser window on the second computer: determining, by the first computer, a second display size of said portion of web page content; selecting, by the first computer, a second set of one or more of the considered advertisements such that the cumulative display size of the selected second set of advertisements does not exceed the second display size of said portion of web page content; and re-rendering the web page requested from the second computer with the selected second set of advertisements and sending the re-rendered web page from the first computer to the second computer.

7. An apparatus for managing the display of an advertisement on a world wide web page with respect to a portion of web page content, said apparatus being configured with code, which when executed causes the apparatus to perform steps comprising: at a first computer, determining the display size of web page content to be rendered on a world wide web page at a second computer; at the first computer, assigning a priority to an advertisement in a set of a plurality of advertisements, one or more of the advertisements of the set for display on a world wide web page in association with said web page content, each of said advertisements in said set having a display size; when assembling advertisements to be rendered with web page content to be rendered for display on a given world wide web page, said advertisements being considered in sequence based on their assigned priority; wherein considering advertisements includes determining the difference between said display size of said portion of web page content and the cumulative display size of a plurality of considered advertisements for display on a world wide web page at the second computer; if the display size of the next advertisement in sequence for selection exceeds said difference then omitting said next advertisement and considering the subsequent 4 advertisement in sequence for display on a world wide web page at the second computer; and rendering a web page at the first computer with the web page content and sending the rendered webpage to the second computer, the second computer previously requesting the received rendered web page, wherein a length of the web page being rendered is dynamically set by the first computer dependent upon the size of the window of the web page of the web browser of the second computer in which the web page is to be displayed.

8. The apparatus according to claim 7 being further configured to perform steps comprising: decreasing said priority for each advertisement selected for display.

9. The apparatus according to claim 7 being further configured to perform steps comprising: decreasing said priority for each advertisement selected for display; and at the first computer, limiting a rate at which the rendered web page is re-rendered, wherein limiting the rate is performed in order to avoid resizing rates above a predetermined frequency.

10. The apparatus according to claim 7 being further configured to perform steps comprising: assigning a base priority to one or more of said advertisements; and resetting said priority of a given advertisement to said base priority in response to said given advertisement being selected for display.

11. The apparatus according to claim 7 being further configured to perform steps wherein at least the display size of web page content determined reflects the pixel size of the web page content or the display size of considered advertisement reflects the pixel size of the considered advertisements.

12. The apparatus according to claim 7 being further configured to perform steps comprising: in response to resizing of a browser window, re-rendering the webpage as determined by the first computer, wherein the rate at which the webpage is re-rendered is limited to avoid resizing rates above a predetermined frequency.

13. A computer program stored on a non-transient computer readable medium and loadable into the internal memory of a computer, comprising software code portions arranged, when said program is run on a computer, for transforming the computer to perform a method comprising: at a first computer, determining the display size of web page content to be rendered on a world wide web page; at the first computer, assigning a priority to an advertisement in a set of a plurality of advertisements, one or more advertisements in the set for display on a world wide web page of a second computer with said web page content, each of said advertisements in said set having a display size; at the first computer, assembling advertisements to be rendered with web page content to be rendered for display on a given world wide web page, said advertisements being considered in sequence based on their assigned priority; wherein considering advertisements includes determining the difference between said display size of said portion of web page content and the cumulative display size of a plurality of considered advertisements to be rendered for display on a world wide web page at the second computer; if the display size of the next advertisement in sequence for selection exceeds said difference then omitting said next advertisement and considering the subsequent advertisement in sequence for display on a world wide web page at the second computer; and at the first computer, rendering a web page using the assembled advertisements and sending the rendered web page to the second computer, wherein a length of the web page being rendered is dynamically set by the first computer dependent upon the size of the window of the web page of the web browser of the second computer in which the web page is to be displayed.

14. The computer program of claim 13 wherein the software code portions are further arranged to transform the computer to perform a method further comprising: at the first computer, re-rendering the web page comprising different assembled advertisements.

15. The computer program of claim 14 wherein the software code portions are further arranged to transform the computer to perform a method further comprising: decreasing said priority for each advertisement selected for display on a world wide web page, and at the first computer, limiting a rate of re-rendering to avoid resizing rates above a predetermined frequency.

16. The computer program of claim 13 wherein the software code portions are further arranged to transform the computer to perform a method further comprising: decreasing said priority for each advertisement selected for display on a world wide web page.

17. The computer program of claim 13 wherein the software code portions are further arranged to transform the computer to perform a method further comprising: assigning a base priority to one or more of said advertisements; and resetting said priority of a given advertisement to said base priority in response to said given advertisement being selected for display.

18. The computer program of claim 13 wherein the software code portions are further arranged to transform the computer to perform a method comprising: in response to resizing of a browser window, re-rendering the webpage as determined by the first computer, wherein the rate at which the webpage is re-rendered is limited to avoid resizing rates above a predetermined frequency.

* * * * *